(12) United States Patent
Hancock et al.

(10) Patent No.: US 8,351,688 B2
(45) Date of Patent: Jan. 8, 2013

(54) CATEGORIZATION QUALITY THROUGH THE COMBINATION OF MULTIPLE CATEGORIZERS

(76) Inventors: Scott Robert Hancock, Webster, NY (US); Francois Ragnet, Venon (FR); Damien Cramet, Grenoble (FR)

(*) Notice: Subject to any disclaimer, the term of this patent is extended or adjusted under 35 U.S.C. 154(b) by 353 days.

(21) Appl. No.: 12/640,030

(22) Filed: Dec. 17, 2009

(65) Prior Publication Data
US 2011/0150323 A1    Jun. 23, 2011

(51) Int. Cl.
*G06K 9/62* (2006.01)
*G06E 1/00* (2006.01)
(52) U.S. Cl. .............. 382/159; 382/224; 706/20
(58) Field of Classification Search .......... 382/159, 382/181, 224, 155, 100, 103, 225, 190, 195, 382/199, 173, 128, 133, 276, 278, 280, 156, 382/158, 232, 240; 706/15, 16, 20, 14, 52, 706/12; 707/E17.09, E17.001, E17.058, 707/E17.089
See application file for complete search history.

(56) References Cited

U.S. PATENT DOCUMENTS

| | | | | | |
|---|---|---|---|---|---|
| 5,410,637 | A | * | 4/1995 | Kern et al. | 706/52 |
| 5,561,431 | A | * | 10/1996 | Peele et al. | 342/90 |
| 7,515,756 | B2 | * | 4/2009 | Hashimoto | 382/224 |
| 7,610,225 | B2 | * | 10/2009 | O'Neill | 705/30 |
| 8,103,081 | B2 | * | 1/2012 | Gossage et al. | 382/133 |

* cited by examiner

*Primary Examiner* — Sheela Chawan
(74) *Attorney, Agent, or Firm* — Fay Sharpe LLP

(57) ABSTRACT

A system categorizes one or more objects based at least in part upon one or more characteristics associated therewith. A first classifier includes a rule set to determine if each of the one or more objects meets or exceeds a quality threshold. A second classifier, orthogonal to the first classifier, includes a rule set to determine if each of the one or more objects meets or exceeds a quality threshold. In one embodiment, the quality threshold associated with the first classifier and the quality threshold associated with the second classifier are less than a predetermined target threshold. The result for each object of the first classifier is compared to the result of the second classifier. The object is categorized if the result of the first classifier and the result of the second classifier match. The object is uncategorized if the result of the first classifier does not match the result of the second classifier.

20 Claims, 8 Drawing Sheets

CATEGORIZATION QUALITY THROUGH THE COMBINATION OF MULTIPLE CATEGORIZERS

BACKGROUND

The present application is directed to the classification of objects via multiple categorizers. It finds particular application in conjunction with the classification of documents via two orthogonal categorizers with reduced quality standards, and will be described with particular reference thereto. It is to be appreciated, however, that the present exemplary embodiments are also amenable to other like applications.

In statistics, logistic regression is used to predict probability of occurrence of an event by fitting data to a logistic curve. It is a generalized linear model used for binomial regression. Like many forms of regression analysis, it makes use of several predictor variables that may be either numerical or categorical. For example, the probability that a person has a heart attack within a specified time period might be predicted from knowledge of the person's age, sex and body mass index. Logistic regression is used extensively in the medical and social sciences as well as marketing applications such as prediction of a customer's propensity to purchase a product or cease a subscription. For instance, logistic regression is a useful way to describe the relationship between one or more factors (e.g., age, sex, etc.) and an outcome that has only two possible values, such as death (e.g., "dead" or "not dead").

In the field of machine learning, the goal of classification is to use an object's characteristics to identify which class (or group) it belongs to. In a statistical classification task, the precision for a class is the number of true positives (e.g., the number of items correctly labeled as belonging to the positive class) divided by the total number of elements labeled as belonging to the positive class (e.g., the sum of true positives and false positives, which are items incorrectly labeled as belonging to the class). In contrast, recall is defined as the number of true positives divided by the total number of elements that actually belong to the positive class (e.g., the sum of true positives and false negatives, which are items which were not labeled as belonging to the positive class but should have been). A linear classifier identifies an appropriate class for an object, wherein a classification decision is based on the value of a linear combination of the characteristics. An object's characteristics are also known as feature values and are typically presented to the machine in a vector called a feature vector. Sparse Linear Regression (SLR) is a discriminative classifier, whose aim is to learn the differences between classes.

Prior art FIG. 1 illustrates a distribution 100 of shape objects classified via SLR. In this example, a dividing line 110 is representative of a dichotomy between exemplary shape object classes: circles and squares. The distance between the objects and the dividing line 110 is commensurate with a confidence value that an object has been correctly classified. Thus, objects 120, 130 are associated with a high confidence value whereas objects 122, 132 are associated with a relatively low confidence value. To reduce false positive classifications, a threshold confidence level can be set as indicated by dashed lines 150, 152. Thus, objects within the lines 150, 152 are not classified as either a circle or a square. Such a methodology can eliminate many incorrect, as well as many correct, object classifications.

Instead of learning to determine what features comprise each object, SLR only learns distinguishing characteristics between objects. For example, SLR does not learn that squares are made of four lines connected at right angles to each other. Instead, utilizing an initial training set, SLR might distinguish squares from circles as squares do not include curved lines. In addition, as a discriminative classifier, SLR is not designed to detect outliers and/or to address novel objects not included in the original training set.

Prior art FIG. 2 illustrates this deficiency when a novel object 220 (e.g., a square with rounded corners) is introduced for classification. The only observation that SLR will be able to make for the novel object 220 is that it contains curved lines and thus is far closer to the circles class than to the squares class. Accordingly, the novel object 220 is assigned to the circles class with a high confidence score based on the initial training set provided to the SLR since the novel object 220 has curved lines. This classification, however, is an example of a false positive as the novel object 220 is a square.

If a distance metric, such as a threshold, is relied upon to remove this false positive, a lot of true positives can also be eliminated. Accordingly, in this case, increasing the precision will prove costly to the recall. This problem points out the limitation of an SLR classifier: to detect novelties, information is needed with regard to the classes' proper characteristics, which is information that discriminative classifiers are simply unable to provide. Conventionally, methodologies simply ignore this shortcoming and state that for a large number of classes (e.g., highly multi-dimensional), it should be addressed by counterparting the linear decision boundary issue. See e.g., *Logistic Regression for Binary Classification*, Paul Komarek, 2005 (online at http://komarix.orq/ac/lr/). This may work when a training set is a sufficient representation of the universe of all the objects to be encountered. It fails, however, to account for novel objects introduced subsequently as cases have classes that are relevant categories only at a given point in time, and do not include classes to accommodate novel objects.

This problem can be further exacerbated in view of stringent precision targets (e.g., 99% or greater), as conventional solutions do not provide an efficient means to reach high level precision without lowering recall. Thus, systems and methods are needed to overcome the above-referenced problems with conventional classification algorithms used to categorize objects.

BRIEF DESCRIPTION

According to an aspect of the subject embodiments, a system categorizes one or more objects based at least in part upon one or more characteristics associated therewith. A first classifier includes a rule set to determine if each of the one or more objects meets or exceeds a quality threshold. A second classifier, orthogonal to the first classifier, includes a rule set to determine if each of the one or more objects meets or exceeds a quality threshold. The result for each object of the first classifier is compared to the result of the second classifier. The object is categorized if the result of the first classifier and the result of the second classifier match. The object is uncategorized if the result of the first classifier does not match the result of the second classifier.

According to another aspect of the subject embodiments, a system categorizes a plurality of objects based upon one or more characteristics associated with each object. A first categorizer includes one or more classifiers wherein each of the one or more classifiers utilizes a substantially similar algorithm. A second categorizer, orthogonal to the first categorizer, includes one or more classifiers that utilizes substantially similar rule sets. The first categorizer and the second categorizer each classify each of the one or more objects, wherein if the first categorizer and the second categorizer output a matching result for an object, it is categorized and if the result of the first categorizer and the second categorizer do not match, the object is uncategorized.

According to yet another aspect of the subject embodiments, a method is used to classify objects wherein one or more objects are received and each object includes a metric. A target threshold related to the metric is identified and a first classifier is applied to the object that is associated with a threshold value which is lower than the target threshold value. A second classifier, orthogonal to the first classifier, is applied wherein a threshold value associated with the second classifier is lower than the target threshold. The object is placed into a categorized database if the object metric is greater than or equal to the threshold for both the first classifier and the second classifier.

DETAILED DESCRIPTION

The embodiments described herein can be utilized to classify objects based on one or more predetermined characteristics. As set forth herein, objects can include images, logos, text strings, documents, etc. In one example, the objects are documents. In another example, the objects are employed to classify a document. To this end, quality target thresholds can be established by introducing a training set into a classification system. Subsequently a first categorizer, including one or more similar classifiers, can be utilized to classify documents as meeting a standard that is less than the established threshold. At substantially the same time, the documents can be classified via second categorizer, orthogonal to the first categorizer, which contains one or more classifiers that also contain a threshold that is lower than the established quality threshold.

The use of orthogonal categorizers with a lower threshold allows a high level of precision and recall within an object data set. Accordingly, desired threshold levels for accurately classifying objects (e.g., documents) according to terms of an agreement between a service provider and a customer can be met while at the same time minimizing the need for manual resources. Thus, such resources can be reallocated to provide greater overall workforce productivity. Moreover, the systems and methods herein facilitate an improvement in precision (rate of correct classifications), recall (percentage of objects correctly classified in one category) and resilience to novel objects (objects that are new to the system).

Figure 1:
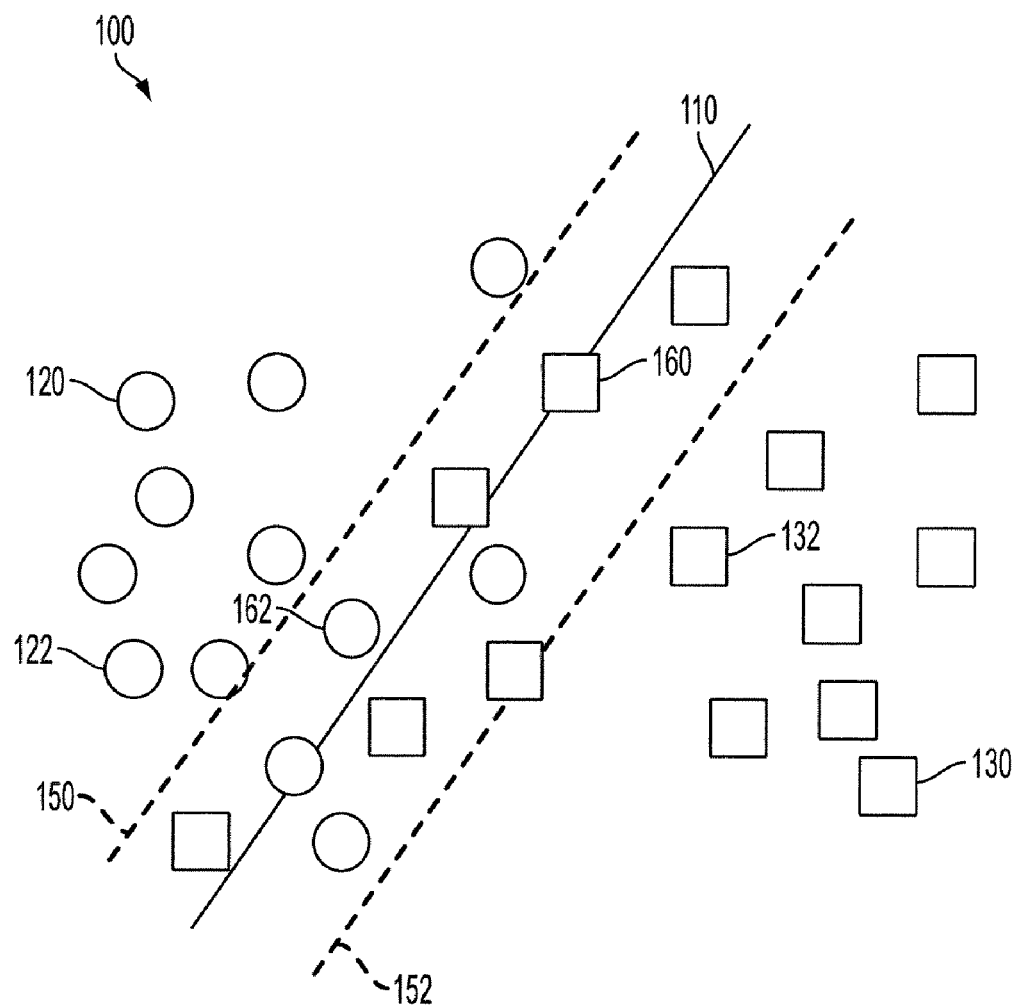
FIG. 1 illustrates a depiction of a classifier with a quality threshold that is distinguishing between a first object (circle) and a second object (square), in accordance with an exemplary embodiment.
Figure 2:
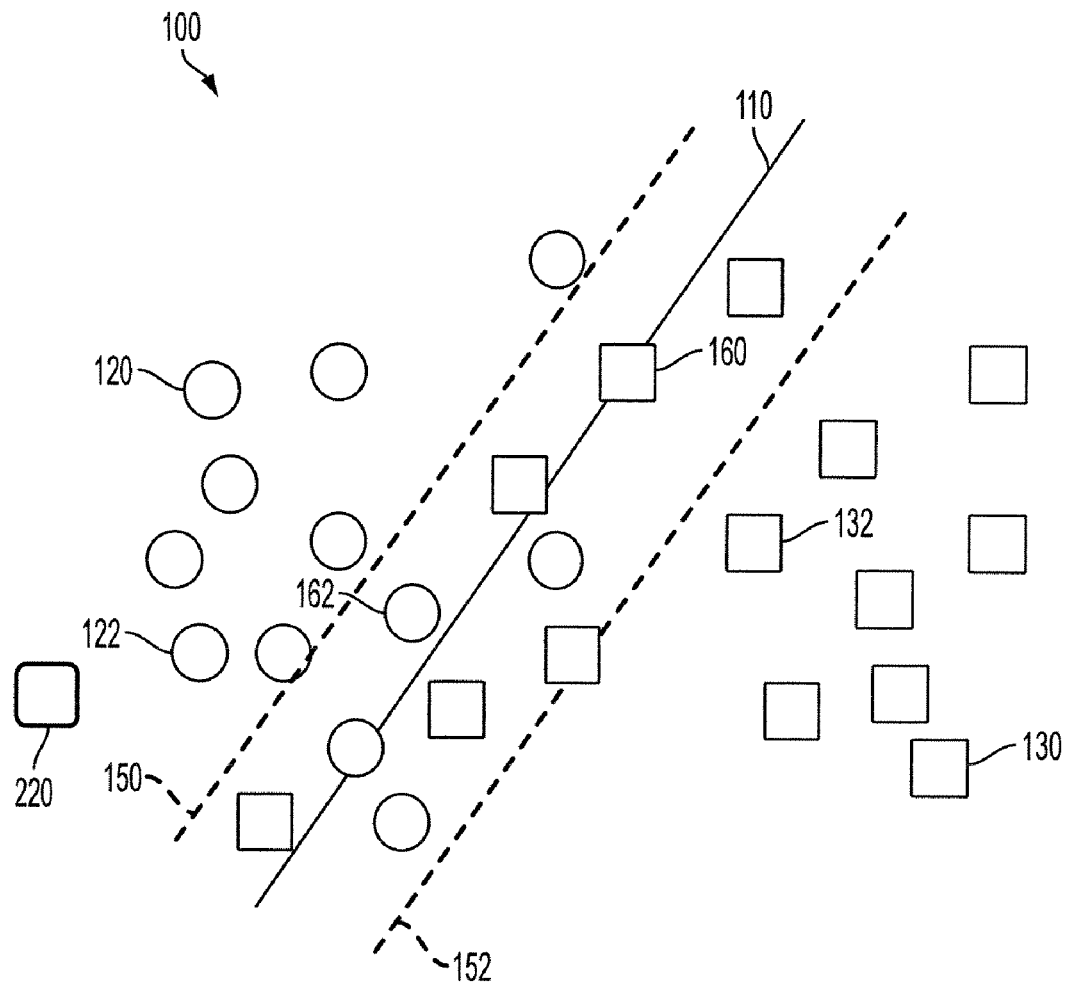
FIG. 2 illustrates the depiction set forth in FIG. 1, wherein a novel object (rounded square) is introduced and misclassified, in accordance with an exemplary embodiment.
Figure 3:
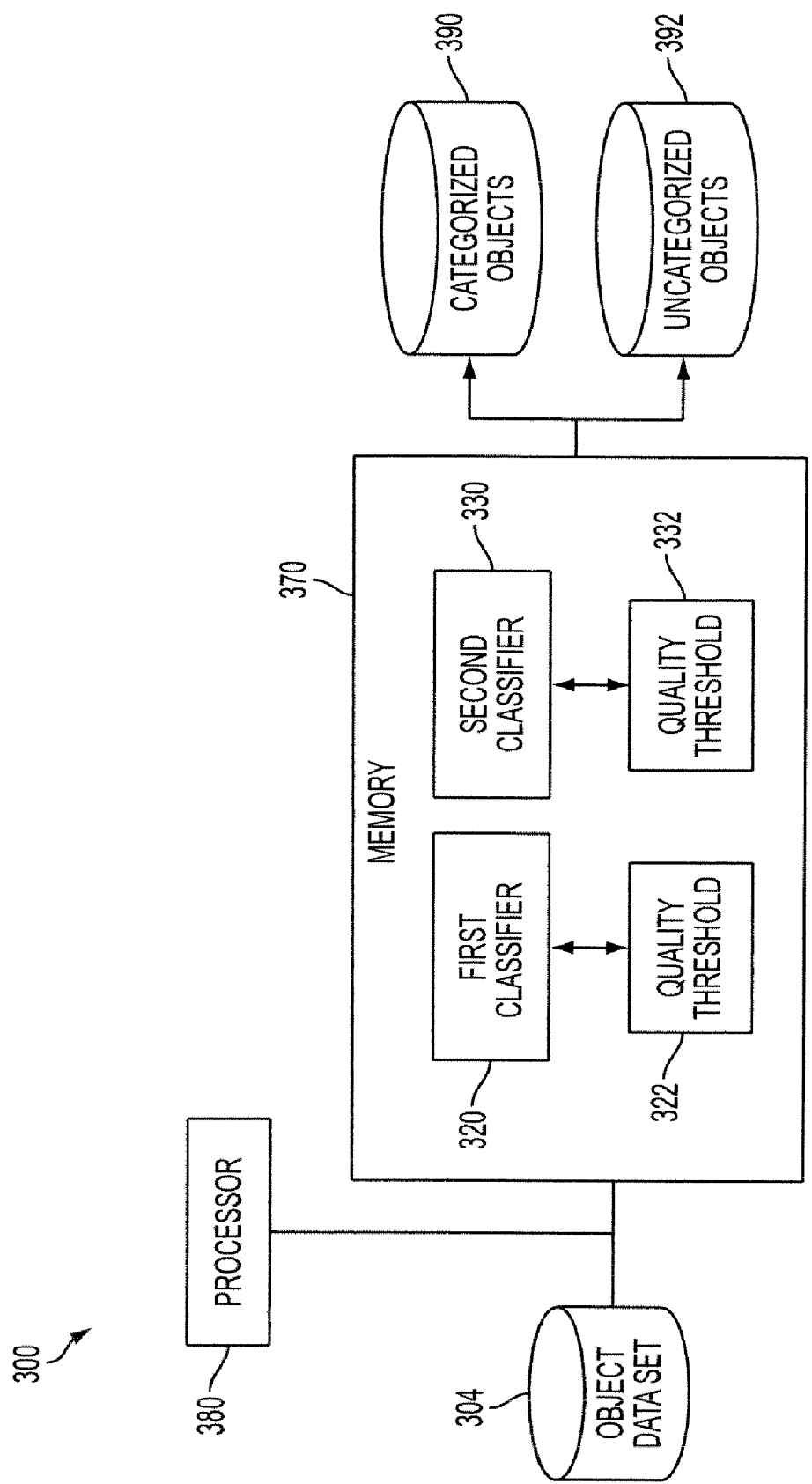
FIG. 3 illustrates a system that categorizes objects from a data set via a first classifier and a second classifier, in accordance with an exemplary embodiment.

FIG. 3 illustrates classification system 300 that categorizes objects from an object data set 304 via a first classifier 320 and a second classifier 330. The classification system 300 includes a processor 380 that executes and a memory 370 that stores computer executable instructions and/or computer readable data for performing various techniques and/or methods described herein. The memory 370 may be a computer readable recording medium on which a control program is recorded, such as a disk, hard drive, or the like. Common forms of computer-readable media include, for example, floppy disks, flexible disks, hard disks, magnetic tape or any other magnetic storage medium, CD-ROM, DVD or any other optical medium, a ROM, a PROM, an EPROM, a flash EPROM, or other memory chip or cartridge, or any other tangible medium form which a computer can read and use. Alternatively, the method may be implemented in a transmittable carrier wave in which the control program is embodied as a data signal using transmission media, such as acoustic or light waves, such as those generated during radio wave and infrared data communications, and the like.

A memory 370 stores the first classifier 320 and the second classifier 330 each of which are coupled to respective quality thresholds 322 and 332. The first classifier 320 and the second classifier 330 receive objects (e.g., images, logos, text strings, etc.) from the data set 304 and determine whether each object meets or exceeds the quality thresholds 322 and 332. In one embodiment, the first classifier 320 is orthogonal to the second classifier 330, wherein each classifier utilizes disparate algorithms and/or rules to evaluate each object in view of particular quality threshold values. In one instance, the quality threshold values 322 and 332 are established via an initial training set, wherein objects are received by the classification system 300 strictly to provide benchmarking for target quality thresholds. This benchmarking process can be directed toward a particular characteristic of each object such as a content feature within a document.

Once the first classifier 320 and the second classifier 330 have both classified an object, their results can be compared to determine whether placement within a categorized objects database 390 or an uncategorized objects database 392 is warranted. In one example, objects which are not included within the categorized database 390 are placed into the uncategorized database 392 by default. Their requirement for inclusion in the categorized database 390 can be related to substantially any number of factors. In one example, if the first classifier 320 and the second classifier 330 classify an object in the same manner and at least one has a high confidence level, inclusion in the categorized database 390 can be warranted. Alternatively or in addition, if the first classifier 320 provides a specific classification and the second classifier 330 does not disagree, inclusion of the categorized database 390 can be warranted.

Figure 4:
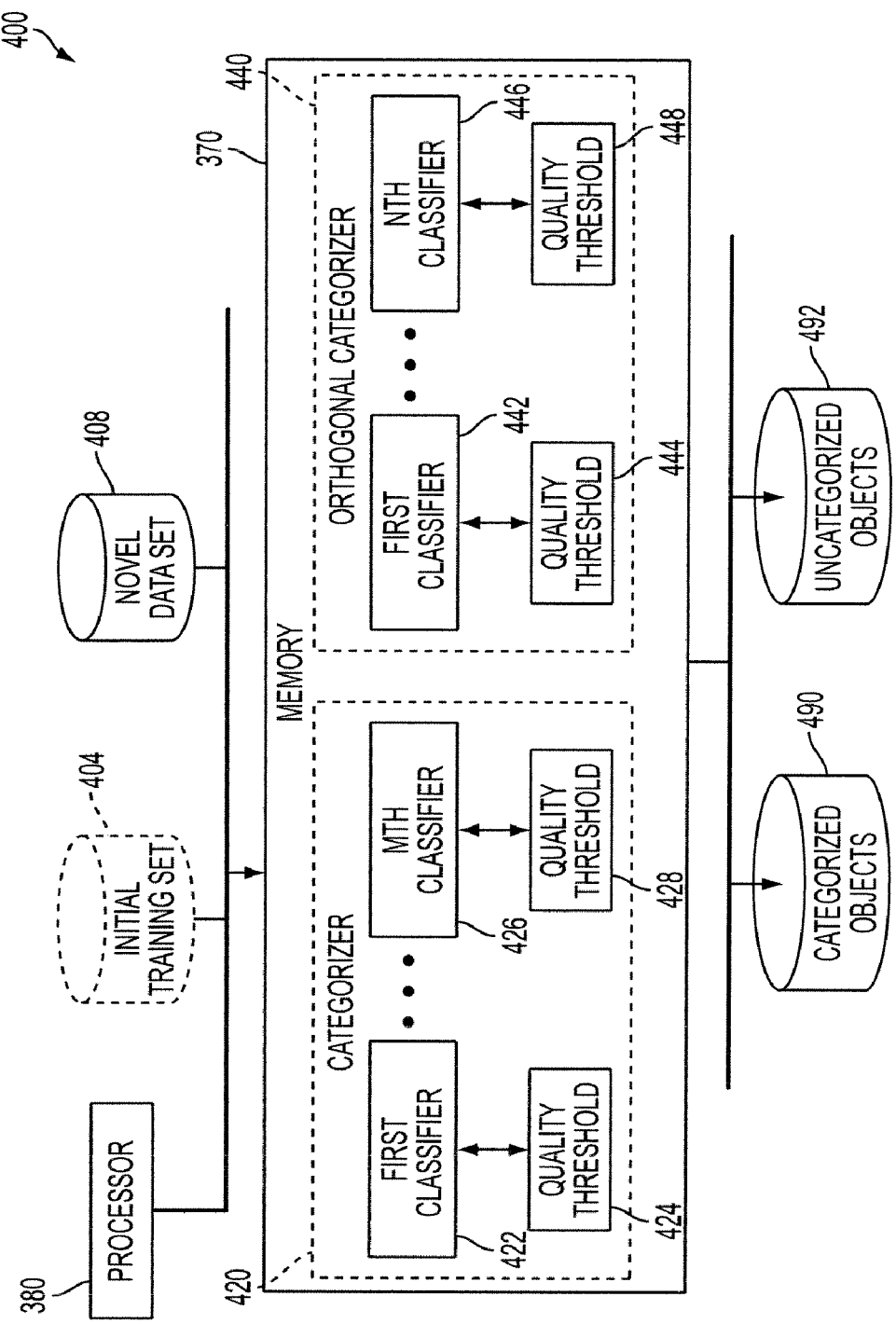
FIG. 4 illustrates a system that categorizes objects via a categorizer that contains one or more classifiers and an orthogonal categorizer that contains one or more classifiers, in accordance with an exemplary embodiment.

FIG. 4 illustrates a classification system 400 wherein objects are categorized via orthogonal categorizers that include a relaxed quality threshold. An initial training set 404 is utilized to establish specific quality target thresholds by introducing a plurality of objects into the system 400 to be classified based on one or more characteristics. The objects from the initial training set 404 are received by both a categorizer 420 and a categorizer 440, which is orthogonal to the categorizer 420. Once classification is complete via the categorizer 420 and the categorizer 440, each object is placed into a categorized database 490 or an uncategorized database 492, as appropriate. The process of receiving and categorizing objects can be continued until particular benchmark quality thresholds have been established. Such thresholds can be dependent upon the type and number of classifiers utilized with the categorizers 420, 440, the speed requirement for such categorization, the prominence and/or frequency of one or more characteristics associated with each object, etc.

Once the initial training set 404 has established such quality thresholds, the categorizers 420 and 440 can be modified to accommodate real world data input. Each of the classifiers within the categorizer 420 including the first classifier 422 and the mth classifier 426 can lower a quality threshold value associated with each of the classifiers within the categorizer 420 to a level that is less than the established benchmark from the initial training set 404. In this manner, quality thresholds including a quality threshold 424 associated with the first classifier 422 and a quality threshold 428 is associated with the mth classifier 426 can be reduced to facilitate the classification each object via the respective classifiers. Similarly, the classifiers within the categorizer 440 including a first classifier 442 and an nth classifier 446 can utilize quality thresholds 444 and 448 respectively that are lower than the benchmark established via the initial training set 404. In this manner, objects that may otherwise be discarded as unclassified as they are lower than a benchmarking quality threshold standard may instead be classified as meeting or exceeding a lower quality threshold.

Classifiers within the categorizer 420 have similar rule sets that can provide substantially the same result with regard to same/similar objects. Classifiers within the categorizer 440 also have similar rule sets to provide the same/similar results for similar objects received. Thus, classifiers within the categorizer 420 and the categorizer 440 are similar to each other within the respective categorizer but different (orthogonal) outside or relative to the other categorizer. In other words, the categorizer 420 that has a rule set for classifiers contained therein wherein a completely different rule set is used for classifiers within the categorizer 440.

Utilizing orthogonal categorizers allows for an error made by a first categorizer to be caught by the other categorizer. For example, an object may be incorrectly classified in one categorizer and correctly categorized in the orthogonal categorizer. The result of the inconsistent classification of an object will result in a discarding or placement into the uncategorized database 492 and mitigate the possibility of false positive classification. As orthogonal categorizers can be viewed as a type of failsafe, the lowering of the respective quality thresholds does not cause deleterious consequences. In contrast, the lowering of the respective quality thresholds for each classifier facilitates a greater number of objects to be classified and the agreement between categorizers 420, 440 can be a requirement for placement of an object into the categorized database 490. Thus, classification of objects, even though they may be incorrect, is acceptable as the system relies on agreement between both categorizers 420, 440.

Objects that were not part of the initial training set 404 are stored in the novel data set 408. Even though these objects have not yet been classified, they can nevertheless be properly categorized as the relaxed quality thresholds can allow classification from both categorizers 420, 440, which can result in placement of novel objects into the categorized database 490 if the categorizers provide the same classification result. Classification of novel objects within a classification system can provide a great advantage to situations where a training set does not include at all possible iterations of an object and/or all iterations of characteristics associated with each object. Accordingly, the training set 404 and the training associated therewith can require less time and/or expense than conventional classification systems. Ultimately, the use of the categorizers 420, 440 that each contain classifiers with relaxed quality thresholds can result in an increase of precision of object classification. In addition, recall can be decreased negligibly or in some cases even increased.

Figure 6:
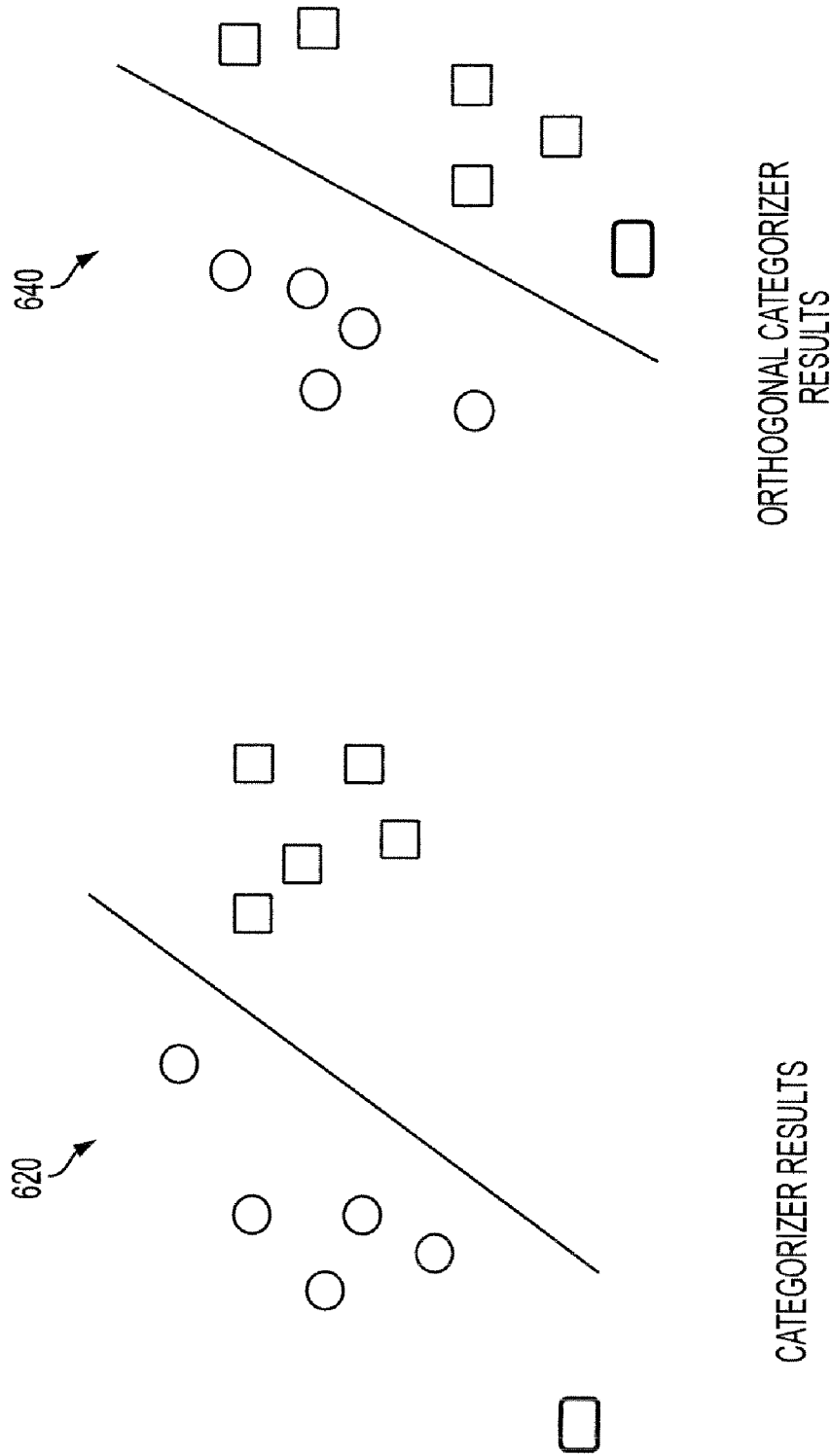
FIG. 6 is a depiction of classification of a rounded square from a categorizer and an orthogonal categorizer in FIG. 3, in accordance with an exemplary embodiment.

Referring briefly to FIG. 6, which illustrates classification of objects from the orthogonal categorizers 420 and 440 as categorizer results 620 and orthogonal categorizer results 630 respectively. In one example, the categorizer 420 utilizes a rule set wherein objects that include a curved line are classified as a circle and objects without a curved line are classified as a square. Accordingly, when a novel object such as a rounded square is introduced, the categorizer 420 can generally classify the novel object as a circle since it contains a curved line (e.g., at the corners). In contrast, the orthogonal categorizer 440 can utilize a rule set wherein objects with a straight line are classified as squares and objects without a straight line are classified as circles. Accordingly, the orthogonal categorizer 440 classifies the novel object as a square, which is the opposite result of the categorizer 420. As the categorizer 420 classified the novel object as a circle whereas the orthogonal categorizer 440 classified the novel object as a square, there is an inconsistent classification between categorizers. As a result, the novel object would be placed in the uncategorized database 492.

Figure 7:
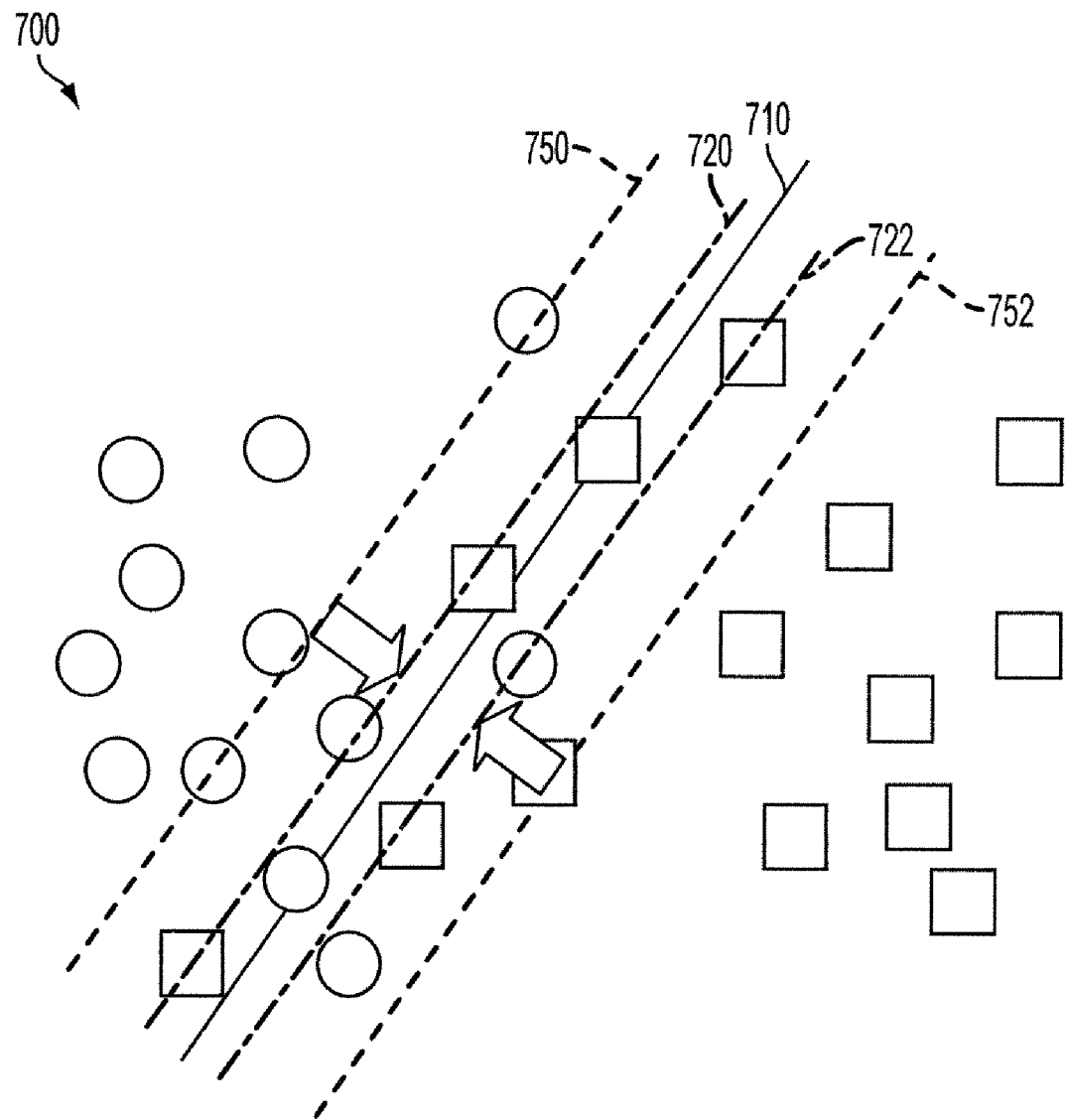
FIG. 7 is a depiction of a classifier, wherein the quality threshold is reduced to facilitate classification of a greater number of objects, in accordance with an exemplary embodiment.

Referring now to FIG. 7 which depicts a classifier 700 wherein the target threshold 750, 752 has been lowered to a relaxed threshold value 720, 722 around a decision point 710. As shown, utilizing the relaxed threshold values 720, 722 allows a greater plurality of objects to be classified on either side of the decision point 710. Utilizing the relaxed threshold in conjunction with at least one orthogonal classifier as discussed above facilitates maintenance of a high level of precision and recall for classification modalities.

Figure 5:
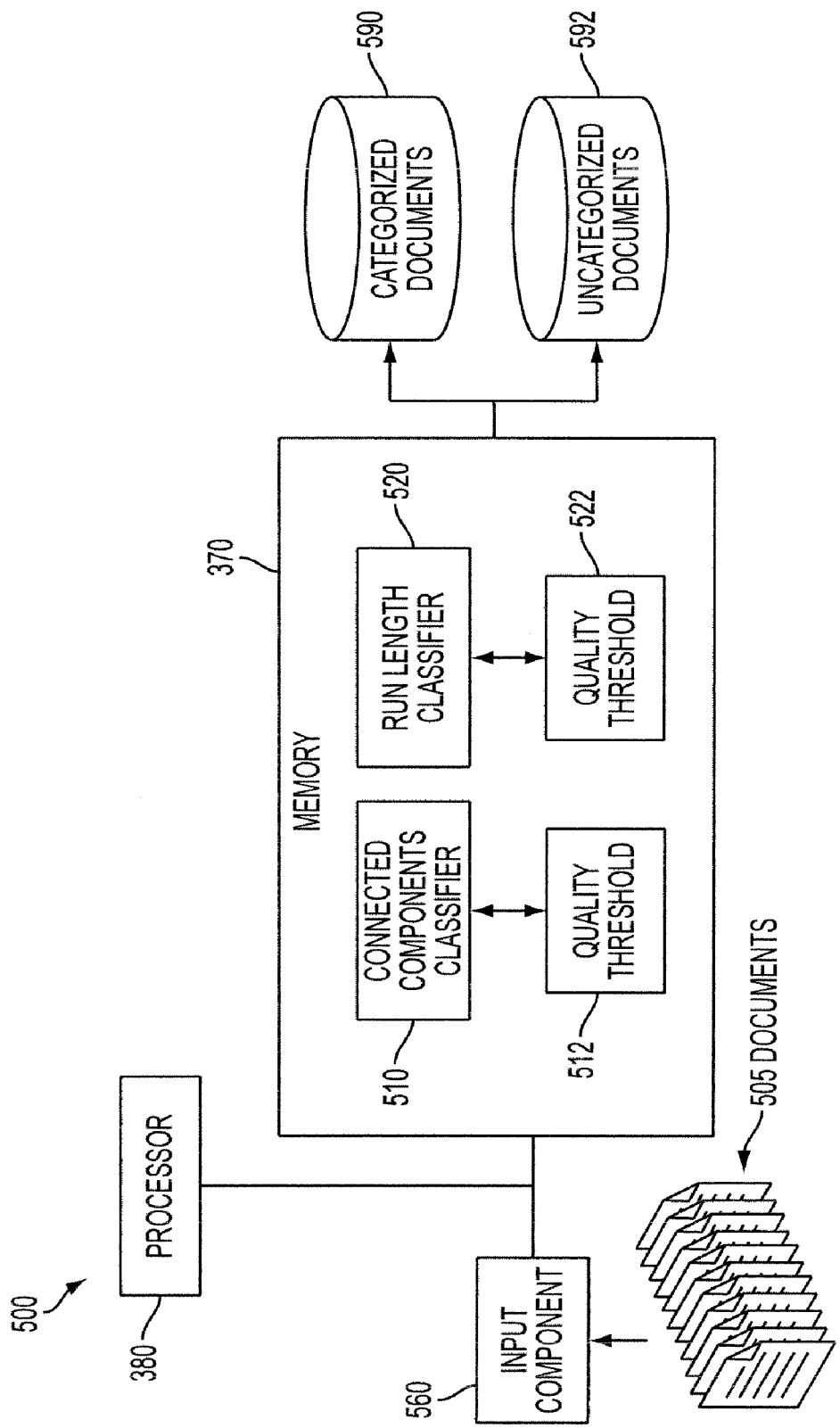
FIG. 5 illustrates a system that categorizes documents via a connected components classifier and a run length classifier that is orthogonal to the connected components classifier, in accordance with an exemplary embodiment.

Referring now to FIG. 5, which illustrates a classification system 500 that receives and classifies a plurality of documents 505. In this embodiment, a connected components classifier 510 and an orthogonal run length classifier 520 are utilized to classify each document 505. An input component 560 can be employed to scan or otherwise electronically reproduce and analyze the documents 505 for transmission and review via the connected components classifier 510 and the run length classifier 520 stored within the memory 370. The input of the documents 505 into the classification system 500 can be facilitated via the processor 380 coupled to the input component 560 and memory 370 as discussed above with regard to FIG. 3.

Each of a quality threshold 512 associated with the connected components classifier 510 and a quality threshold 522 associated with the run length classifier 520 are set to a value lower than a benchmark established via a training set. The results from the connected components classifier 510 and the run length classifier 520 can be compared to determine whether the result is the same or different. If the result of classification is the same, the object is placed into the categorized documents database 590. If, however, the result is different, the object is placed in the uncategorized documents database 592.

Table 1 below provides an exemplary data set to illustrate the impact the use of orthogonal classifiers with lower thresholds has when used to categorize objects. As used below, "CC" refers to categorization via the connected components classifier 510 and "RL" refers to categorization via the run length classifier 520. As shown in the first line, CC 99 refers to classification via the connected components classifier, having learnt a model with a target 99% quality and precision. Once evaluated on real data, the ideal target becomes approximate can represent a slight overestimation, because the thresholds have been calculated very tight to the actual limit on the training set. As the real data real set is different than the training set since it includes "outliers" and novelty, actual performance can be slightly less than initially expected.

As shown, when targeting 99% quality with a single CC classifier, actual recall is around 74.8% and precision is around 98.2%. In contrast, a single RL classifier achieves 74% recall and 97.4% precision. These numbers refer to actual performance expected in a production setting.

TABLE 1

|  | Evaluation | |
| --- | --- | --- |
|  | Recall | Precision |
| CC 99 | 74.82% | 98.18% |
| CC 98 | 78.61% | 96.67% |
| CC 95 | 84.52% | 93.53% |
| CC 90 | 89.05% | 91.70% |
| RL 99 | 73.94% | 97.43% |
| RL 98 | 80.33% | 96.87% |
| RL 95 | 87.59% | 93.76% |
| RL 90 | 93.93% | 90.69% |
| CC 99 AND RL 99 | 69.73% | 99.79% |
| CC 98 AND RL 98 | 75.12% | 99.60% |
| CC 95 AND RL 95 | 78.93% | 99.16% |
| CC 90 AND RL 90 | 81.40% | 98.43% |

When combining the two classifiers (e.g., shown as "CC 99 and RL 99"), however, precision is increased dramatically to around 99.8%., especially through detection of novel objects. The recall value is decreased slightly from around 74% for individual classifiers to around 69% for a combination of two classifiers with lower threshold values. This recall decrease is negligible compared to the quality increase from 98.2% to 99.8%, which represents an error rate decrease of almost ten times (e.g., from 1.8% to 0.2%). This level of precision can barely be achieved via a single classifier, with a very sharp drop in recall.

The lowering of individual classifier quality thresholds increases both precision and recall as most false positive classifications are discarded since the classifiers are orthogonal, as discussed above. For instance, the disparity between a precision value versus a standard via a single classifier and two orthogonal classifiers increases dramatically as the standard is lowered. In one example, the quality precision objective of 95% for each individual classifier is around 94%, which jumps to 99% when combined together. At the same time, a significantly higher recall of 79% is realized. Moreover, the recall value increases as the quality target decreases.

Trade-offs between precision and recall may not be symmetrical in certain targeted (high precision) zones. For example, an extra 1% precision increases can cause much greater than 1% in recall. This tradeoff can be worse as we go higher in precision objective, wherein increasing precision from 98 to 99% with a single classifier can sometimes lead to as much as 20-40% losses in recall and in some cases even greater when a very high precision (e.g., 99.5%) is targeted.

Error can be theoretically predicted if the error rate of each categorizer is known and random and unrelated from categorizer to categorizer. Thus, for two classifiers (e.g. 1 for each categorizer) the error rate can be approximately a square of the error rate of each classifier. Continuing the example, a target of 99% that allows in reality a 97-98% precision or 3% error rate max, the risks of having two classifiers making the same error on the same document is 3%*3% or approximately 0.1%. Accordingly, for 90% precision (10% error rate), 10%*10%=1% can be achievable.

Below are several example data sets that employed the orthogonal classifier—lower threshold modalities discussed herein.

EXAMPLE #1

Contains Very Unstructured and Visual Documents 10,000 documents were extracted twice from an actual flow, and trained two classifier models, one with run length, and one with connected components. The two categorizers were trained with different quality objectives: 90%, 95%, 98%, 99% (e.g., 10%, 5%, 3% and 1% false positive/error rate). A simple categorizer scheme was employed to address a lower confidence threshold (95%), rejecting any document where results did not match. Table 2 illustrates the following results wherein recall is increased by over 20%, while maintaining the quality of the results.

TABLE 2

|  | CC | RL | Combined |
| --- | --- | --- | --- |
| Recall | 57.13% | 46.97% | 77.27% |
| Precision | 97.61% | 98.51% | 98.47% |

EXAMPLE #2

Contains Mostly Structured and Visual Documents

The training samples were separated (e.g., an extract from a live flow) into two equal datasets. Two classifier models were trained, one with run length, and one with connected components. The two categorizers were trained with different quality objectives: 90%, 95%, 98%, 99%. The two categorizers were set to at a lower confidence threshold (95%), but both of them had to agree or the document would be rejected. The results are shown in Table 3 below wherein recall is increased by over 20%, while maintaining the quality of the results.

TABLE 3

|  | CC | RL | Combined |
| --- | --- | --- | --- |
| Recall | 74.82% | 73.94% | 81.40% |
| Precision | 98.18% | 97.43% | 98.43% |

Figure 8:
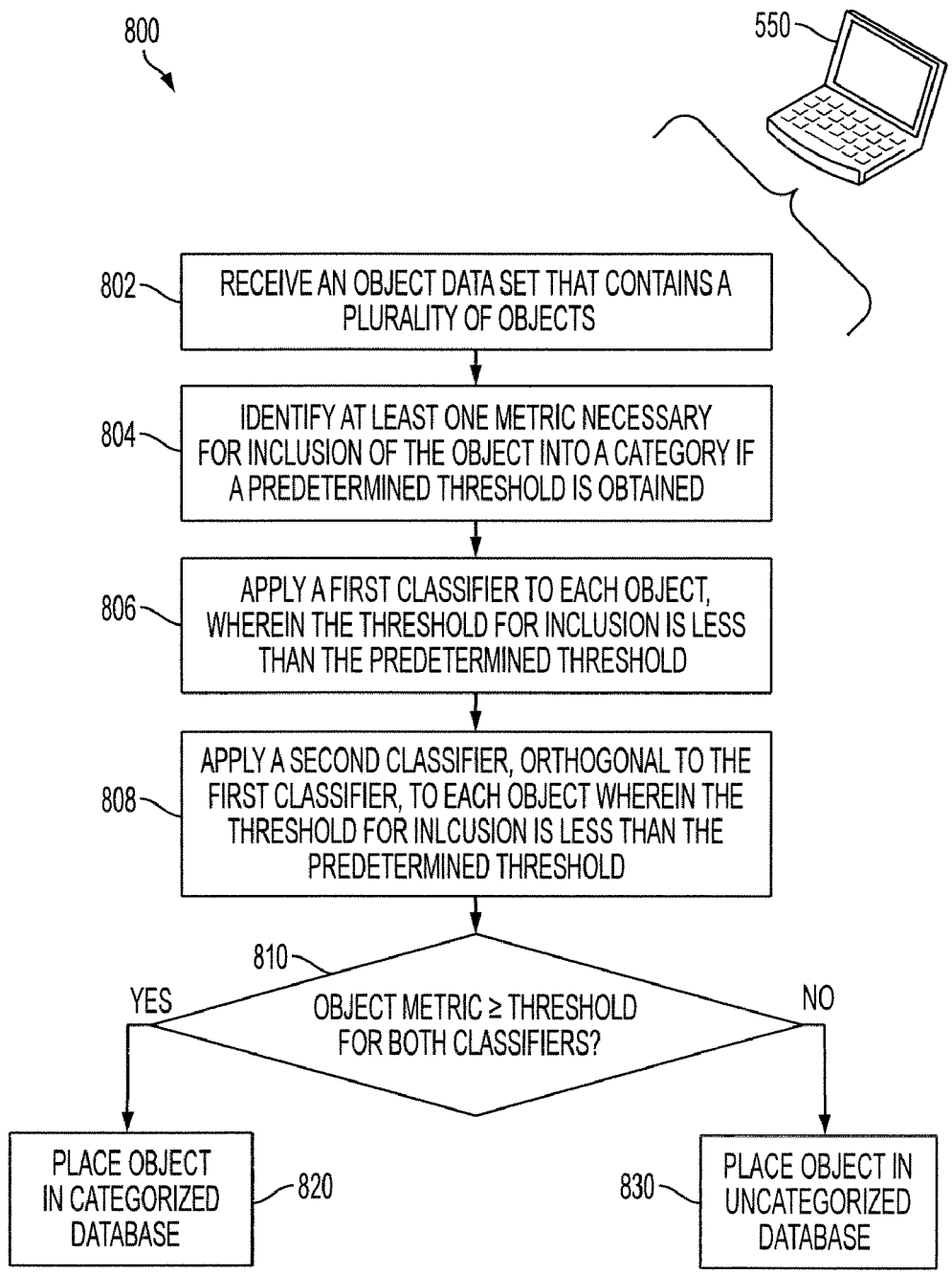
FIG. 8 illustrates a methodology to categorize a plurality of objects via a first classifier and a second classifier, which is orthogonal to the first classifier, in accordance with an exemplary embodiment.

FIG. 8 illustrates a methodology 800 utilized to categorize objects via orthogonal classifiers with relaxed threshold values. At reference numeral 802 an object data set is received that contains a plurality of objects. In one example, the objects are documents. At least one metric necessary for inclusion of the object into a category is identified at 804 for a predetermined threshold to be obtained. In one approach, the predetermined threshold is established via a training set that can establish a particular quality target threshold.

At 806, a first classifier is applied to each object wherein the threshold associated with the first classifier is less than the established target threshold. At 808, a second classifier, orthogonal to the first classifier, is applied to each object.

Again, the threshold for inclusion is less than the predetermined target threshold. If the object metric is greater than or equal to the threshold for both the first classifier and the second classifier at 810, the object is placed in a categorized database at 820. If however, the object metric is not greater than or equal to the threshold for both classifiers, the object is placed into an uncategorized database 830. In this manner, objects can be appropriately categorized via orthogonal classifiers, wherein each classifier utilizes a relaxed threshold to facilitate categorization to maintain a high level of both precision and recall.

A computer 880 illustrates one possible hardware configuration to support the systems and methods described herein, including the method 800 above. It is to be appreciated that although a standalone architecture is illustrated, that any suitable computing environment can be employed in accordance with the present embodiments.

The computer 880 can include a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer 880 can further include a hard disk drive, a magnetic disk drive, e.g., to read from or write to a removable disk, and an optical disk drive, e.g., for reading a CD-ROM disk or to read from or write to other optical media. The computer 880 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer 880 can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc.

A monitor, or other type of display device, is also connected to the system bus via an interface, such as a video adapter (not shown). In addition to the monitor, a computer typically includes other peripheral output devices (not shown), such as speakers, printers etc. The monitor can be employed with the computer 880 to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer 880 via any wireless or hard wire protocol and/or standard.

The computer 880 can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that categorizes one or more objects based at least in part upon one or more characteristics associated therewith, comprising:
    a first classifier that includes a rule set to determine if each of the one or more objects meets or exceeds a quality threshold;

a second classifier, orthogonal to the first classifier, that includes a rule set to determine if each of the one or more objects meets or exceeds a quality threshold;

wherein the result for each object of the first classifier is compared to the result of the second classifier, the object is categorized if the result of the first classifier and the result of the second classifier match and the object is uncategorized if the result of the first classifier does not match the result of the second classifier.

2. The classification system according to claim 1, wherein the quality threshold associated with the first classifier and the quality threshold associated with the second classifier is less than a predetermined target threshold.

3. The classification system according to claim 2, wherein the target threshold is determined via an initial training set that is classified by the classification system to determine an acceptable quality target threshold.

4. The classification system according to claim 3, wherein the first classifier and the second classifier are selected based at least in part upon results obtained from the initial training set.

5. The classification system according to claim 1, wherein the first classifier is a connected component algorithm and the second classifier is a run length algorithm.

6. The classification system according to claim 1, wherein the first classifier and the second classifier are stored within a non-transitory computer readable medium, the algorithm associated with each classifier is executed via a processor coupled to the non-transitory computer readable medium.

7. The classification system according to claim 1, wherein each object is a document which is received and presented to the first classifier and the second classifier for analysis via a scanner.

8. A system to categorize a plurality of objects based upon one or more characteristics associated with each object, comprising:

a first categorizer that includes one or more classifiers wherein each of the one or more classifiers utilizes a substantially similar algorithm;

a second categorizer that is orthogonal to the first categorizer, the second categorizer includes one or more classifiers that utilizes substantially similar rule sets;

wherein the first categorizer and the second categorizer each classify each of the one or more objects, if the first categorizer and the second categorizer output a matching result for an object, it is categorized and if the result of the first categorizer and the second categorizer do not match, the object is uncategorized.

9. The classification system according to claim 8, wherein a quality target threshold is established by the introduction of an initial training set to the classification system.

10. The classification system according to claim 9, wherein a quality threshold is associated with each classifier within the first categorizer and the second categorizer, the value of each of the quality thresholds is less than the established target threshold.

11. The classification system according to claim 10, wherein the target threshold is determined via an initial training set that is classified by the classification system to determine an acceptable quality target threshold.

12. The classification system according to claim 10, wherein the first categorizer utilizes a connected component algorithm and the second categorizer utilizes a run length algorithm.

13. The classification system according to claim 10, wherein the first categorizer and the second categorizer are selected based at least in part upon results obtained from the initial training set.

14. The classification system according to claim 10, wherein one or more objects are classified that are not part of the initial training set.

15. The classification system according to claim 10, wherein an increase in precision is relative to a decrease in recall for the classification system.

16. The classification system according to claim 8, wherein the categorization system receives one or more objects that are not included in the initial training set and provides a classification via the first categorizer and the second categorizer, wherein the precision of object classification is at least maintained while providing a relatively lower recall value.

17. The classification system according to claim 8, wherein each classifier utilized within the first categorizer and the second categorizer is a sparse linear regression classifier.

18. A method to classify objects, comprising:

receiving one or more objects, wherein each object includes a metric;

identifying a target threshold related to the metric;

applying a first classifier to the object that is associated with a threshold value which is lower than the target threshold value;

applying a second classifier orthogonal to the first classifier wherein a threshold value associated with the second classifier is lower than the target threshold; and, placing the object into a categorized database if the object metric is greater than or equal to the threshold for both the first classifier and the second classifier.

19. The method to claim 18, wherein the object is placed in an uncategorized database if the object metric is not greater than or equal to the threshold for both the first classifier and the second classifier.

20. The method according to claim 18, wherein a processor executes the steps as stored in a non-transitory computer readable medium.

* * * * *

UNITED STATES PATENT AND TRADEMARK OFFICE
CERTIFICATE OF CORRECTION

PATENT NO. : 8,351,688 B2
APPLICATION NO. : 12/640030
DATED : January 8, 2013
INVENTOR(S) : Scott Robert Hancock et al.

It is certified that error appears in the above-identified patent and that said Letters Patent is hereby corrected as shown below:

On the Title Page, Item (73) is inserted to read:

--(73) Assignee: Xerox Corporation, Norwalk, CT (US)--

Signed and Sealed this
Second Day of July, 2013

Teresa Stanek Rea
*Acting Director of the United States Patent and Trademark Office*